(12) United States Patent
Cantrell et al.

(10) Patent No.: US 7,223,103 B2
(45) Date of Patent: May 29, 2007

(54) CPR TRAINING DEVICE

(75) Inventors: Elroy T Cantrell, Huntsville, TX (US); Melissa K Waugh, Lynchburg, VA (US)

(73) Assignee: Trainikins, Inc., Lynchburg, VA (US)

( * ) Notice: Subject to any disclaimer, the term of this patent is extended or adjusted under 35 U.S.C. 154(b) by 0 days.

(21) Appl. No.: 10/939,079

(22) Filed: Sep. 10, 2004

(65) Prior Publication Data

US 2005/0058977 A1    Mar. 17, 2005

Related U.S. Application Data

(60) Provisional application No. 60/502,773, filed on Sep. 12, 2003.

(51) Int. Cl.
*G09B 23/28* (2006.01)

(52) U.S. Cl. ........................ 434/265; 434/262

(58) Field of Classification Search ............... 434/265, 434/262, 267; 128/898; 607/5
See application file for complete search history.

(56) References Cited

U.S. PATENT DOCUMENTS

| | | | |
|---|---|---|---|
| 3,152,404 A * | 10/1964 | Wilson et al. ............... 434/265 |
| 4,619,617 A | 10/1986 | Rice | |
| 4,915,635 A * | 4/1990 | Ingenito et al. ............. 434/396 |
| 4,984,987 A | 1/1991 | Brault et al. | |
| 5,040,580 A | 8/1991 | Hufford | |
| 5,195,896 A * | 3/1993 | Sweeney et al. ............. 434/265 |
| 5,249,968 A | 10/1993 | Brault et al. | |
| 5,256,070 A | 10/1993 | Garth et al. | |
| 5,286,206 A | 2/1994 | Epstein et al. | |

(Continued)

FOREIGN PATENT DOCUMENTS

| DE | 4201777 | 7/1993 |
|---|---|---|
| GB | 791741 | 3/1958 |

OTHER PUBLICATIONS

Rescue Critters, www.rescuecritters.com, Jul. 9, 2000, pp. 1-3.*

(Continued)

*Primary Examiner*—Dmitry Suhol
(74) *Attorney, Agent, or Firm*—Vinson & Elkins LLP

(57) ABSTRACT

An inexpensive take-home training aid for practicing human cardiopulmonary resuscitation (CPR) is contained in a non-humanoid shaped housing. When placed in a prominent location in the home, such as a child's room, the CPR training aid reminds users of the CPR sills they have learned and encourages them to practice with the training aid. The internal mechanism consists of a simulated airway, a compression mechanism, a compression feedback mechanism, a metronome, a breast plate and back plate with simulated anatomical landmarks, and/or an external landmark for identifying the proper location for placing a hand, hands, or fingers on the chest. Voice prompts on the steps of CPR and/or actual CPR performance may also be included. The chest plate and back plate are connected by one or more telescoping posts and a resistance device is between the two plates to simulate the resistance of a human chest to compression. The internal mechanism can be placed in a variety of non-humanoid containers such as a child's teddy bear or other stuffed toy. A CPR student can use the toy or other non-humanoid container to practice CPR during a CPR class and then later at home.

33 Claims, 6 Drawing Sheets

U.S. PATENT DOCUMENTS

| | | | |
|---|---|---|---|
| 5,312,259 | A | 5/1994 | Flynn |
| 5,423,685 | A | 6/1995 | Adamson et al. |
| 5,580,255 | A | 12/1996 | Flynn |
| 6,227,864 | B1 | 5/2001 | Egelandsdal et al. |
| 6,530,783 | B1 | 3/2003 | McGinnis |
| 2004/0058305 | A1* | 3/2004 | Lurie et al. ............ 434/265 |

OTHER PUBLICATIONS

New York Times, "A Dog's Best Friend", Jul. 26, 1998.*
Rescue Critters, www.rescuecritters.com.
PCT/US04/029870, Supplementary European Search Report, Jan. 04, 2007.

* cited by examiner

CPR TRAINING DEVICE

CROSS REFERENCE TO RELATED APPLICATION

Priority is claimed to U.S. Provisional Patent Application Ser. No. 60/502,773 filed by the inventors on Sep. 12, 2003, which is incorporated by reference.

BACKGROUND OF THE INVENTION

1. Field of the Invention

The present invention relates to cardiopulmonary resuscitation (CPR), particularly to training and simulation of CPR, and more particularly to an inexpensive take-home device for practicing and maintaining CPR skills.

2. Description of the Related Art

Various forms of resuscitation skills have been practiced for centuries, but it was not until the late 1950's that the concept we commonly refer to as cardiopulmonary resuscitation (CPR) evolved. In 1958 a process for resuscitating victims of respiratory arrest was reported in the literature by Dr. Safar, Dr. Elam, and others. In 1960 Dr. Kouwenhoven reported on a procedure for closed-chest compression of a cardiac arrest victim. Through casual conversations in the 1960's, Dr. Safar and Dr. Kouwenhoven saw the value of combining their two procedures into what is now known as basic CPR. In 1974, standards for cardiopulmonary resuscitation and emergency cardiac care were first published in the Journal of the American Medical Association (JAMA). Now widespread dissemination of CPR skills is encouraged by the American Heart Association, the American Red Cross and others throughout the world, but the survival rate from cardiac arrest remains at an estimated 5% in the U.S. The only way to significantly increase this survival rate is to enable the general public to perform CPR quickly and effectively. The problem is that people can't remember how to do CPR. Historically, CPR students have been shown to retain 96% of their skills immediately after the learning experience, 36% at the end of 1 month, and 6.8% after 6 months. After 30 years of training the lay public in CPR skills serious problems remain with the retention and appropriate application of CPR skills primarily because of the lack of practice of CPR skills after taking a CPR course.

Simulators have been used to teach medical skills for many years. Lay personnel were trained in midwifery skills on obstetric manikins in Paris in the 17th century. Today's state-of-the-art training manikins are expensive, unattractive, and those that could be taken home are more likely to be put away in a closet than to be left out as a constant reminder of the skills learned and the need to practice them. Existing devices do not fully address the problem of significant decline in CPR skills over time because they are not designed to be aesthetically pleasing enough to be left out in plain view in a person's home reminding them of their skills and the need to practice. Some patents have described manikins that were specifically designed to be inexpensive and therefore appropriate for individual students to buy and take home and use to practice their CPR skills, however, none have the aesthetic qualities necessary to encourage the average consumer to leave out in plain view.

An early training device is disclosed in Great Britain Patent No. 791741 (Mar. 12, 1958) showing a training device with folding arms and a head. This device is meant for practicing artificial respiration only and it has two vertical springs supporting a simulated shoulder region.

Later patents teach inexpensive devices that can be used to teach and practice CPR, but almost all take a humanoid shape, and those that do not are not designed to be aesthetically pleasing. If purchased or received, these devices are more likely to be put up in a closet or drawer and forgotten than left out in a home as a reminder of skills learned and the need to practice those skills. U.S. Pat. No. 4,619,617 (Oct. 28, 1986) issued to Cecil L. Rice is an example of this observation. The abstract states that this device is intended to be "a simple and inexpensive teaching and practice aid for CPR" that permits the review of the "mental memory" aspects of CPR. Although it has airway means it does not simulate the rising of the chest when actually performed on a victim, it does not provide anatomical landmarks or other means to ensure that the fingers or hands are properly placed on an infant, child, or adult victim, and there is no feedback on proper compression force or proper compression pacing. The compression mechanism is simply a square piece of foam attached to a square block. In addition, this device lacks any aesthetic appeal to a user.

U.S. Pat. No. 4,984,987 (Jan. 15, 1991), U.S. Pat. No. 5,249,968 (Oct. 5, 1993), and U.S. Pat. No. 5,286,206 (Feb. 15, 1994) by Brault et al. reflect devices that are relatively uncomplicated and inexpensive, however, they lack aesthetic appeal. These devices are also intended for use in a classroom setting, although Brault notes that if the manikin is inexpensive enough students might obtain one to practice their skills at home. The main idea behind these manikins is to provide a manikin that is cheap enough for CPR instructors to provide one for each individual in a class and lightweight enough that the instructor can carry enough manikins for the entire class in a handheld or over the shoulder carrying case. The manikins clearly take on a humanoid shape and the compression mechanism is a resilient hollow bellows adapted to deform and reform under compressive force. The artificial lung does not effect a rise in the chest.

German Patent No. DE4201777 (Jul. 29, 1993) and U.S. Pat. No. 5,256,070 (Oct. 26, 1993) by Garth, et al., disclose a dummy for practicing CPR that is made out of foldable cardboard with pre-determined fold lines and contains a spring in the thorax to simulate the resistance of the thorax and a simulated airway. The most obvious difficulty with this dummy is the complexity a user will encounter in folding the device into a usable form.

U.S. Pat. No. 5,312,259 (May 17, 1994) and U.S. Pat. No. 5,580,255 (Dec. 3, 1996), both reflect the same device which was invented by Stephen Flynn. The manikin described is for practicing CPR and is intended to be neither unduly complex or over-simplified. This device has a human head and torso and is not aesthetically pleasing.

U.S. Pat. No. 5,423,685 (June, 1995) issued to Adamson, et al. teaches a disposable manikin that is low cost, recyclable, and durable. This manikin also takes a humanoid shape and requires folding and other assembly for use. U.S. Pat. No. 6,227,864 (May 8, 2001) issued to Egelandsdal, et al. discloses a dummy design that can be economically produced in spite of a realistic simulation. This dummy also takes a humanoid form and the torso is made of compressively deformable foam.

U.S. Pat. No. 6,530,783 (Mar. 11, 2003) issued to McGinnis discloses a method for simulating the full human torso using "common household items." The idea is to make an inexpensive, disposable manikin that can be used in CPR classes given to children (who can often be destructive of expensive manikins). An added feature of this idea is that the children can "learn the physiology of basic aid training techniques through visual investigation or through actual assembly and disassembly of the mannequin." Once again this device is intended to take a humanoid form and is not meant to be aesthetically pleasing. Although there have been many developments in inexpensive take-home CPR training manikins over the years, there is still a need for innovation and improvement. None overcome the significant hurdle of enticing a user to actually pick it up and practice with it at home.

SUMMARY OF THE INVENTION

The present invention provides a take-home training aid that students can take home from a CPR class and use to practice their CPR skills at home. A simulated airway, compression mechanism, and mechanism to provide immediate feedback on CPR performance is inserted into a non-humanoid housing (such as a teddy bear or other similar stuffed animal). Unlike an unattractive plastic doll or other rudimentary device, this training aid can be prominently placed in a child's room (e.g., on a rocking chair or on a shelf). The device would remind parents or child care providers every day of the skills learned in their CPR class and potentially entice them to pick up the device and practice their skills on a regular basis.

This CPR training aid has a simulated airway that provides resistance comparable to that found when air is blown into human lungs and which causes a chest plate to rise as breaths are given. It also includes a compression mechanism made up of a chest plate, a back plate, and one or more telescoping posts to provide resistance to compression of the chest plate through a spring inside the post or posts, and which prevent the mechanism from being depressed if the user has improper hand/finger placement on the chest plate. The present invention includes a chest plate with anatomical landmarks for proper hand/finger placement, and a back plate with anatomical landmarks for practice clearing the airway. It further includes a compression feedback mechanism to detect compression force and/or depth and a display of such force and/or depth that is placed directly on the CPR training aid and within the line of sight of the user while the invention is in use. The present invention may also include a compression pacing indicator or metronome, a compression counter, and/or a rescue breath indicator. The CPR training aid is preferably housed in a non-humanoid container, such as a stuffed teddy bear or rabbit. Other housings include a stuffed monkey or dog, but the internal mechanisms can also stand alone or include attached, flip-up arms and legs and a flip-up head.

DETAILED DESCRIPTION OF THE INVENTION

1. PREFERRED EMBODIMENT

Figure 1:
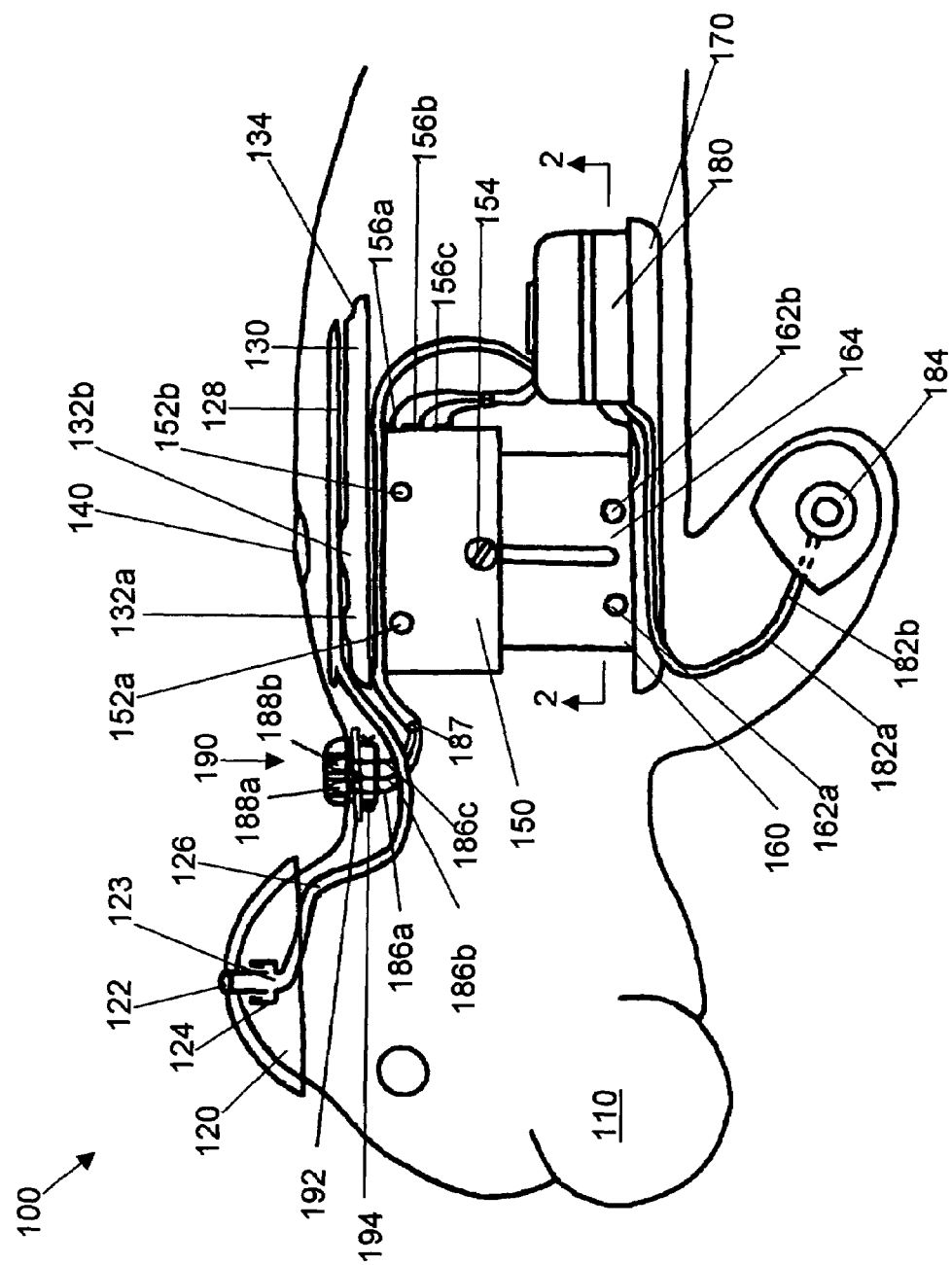
FIG. 1 is a perspective view of the internal mechanism of a non-humanoid CPR training aid, according to the present invention.

Referring to FIG. 1, an embodiment of a CPR training aid 100 in a non-humanoid housing 110 is shown in perspective view. CPR training aid 100 includes a simulated airway, a compression mechanism, and a controller unit and display providing prompting and feedback on CPR performance while learning and practicing CPR.

The simulated airway consists of a removable face mask 120 which is open to ambient air at opening 122 and includes an air tube fitting 123 that is inserted into air tube connector 124. An air tube 126 runs from air tube connector 124 through the neck of non-humanoid housing 110 and attaches to simulated lung 128, which can be a flexible container or air bag and that may be disposable. Simulated lung 128 lies on top of anterior or upper chest plate 130 and inside non-humanoid housing 110. It is calibrated to hold an amount of air equivalent to the amount of air contained in human lungs. The size of simulated lung 128, and hence the amount of air contained in the simulated lung 128, can be changed to approximate the amount of air in an infant's lungs, a child's lungs, or the lungs of an adult.

The removable face mask 120 is not considered to be necessary for the present invention, but could be an additional feature to make practicing rescue breathing more comfortable and hygienic. If removable face mask 120 is not used, a CPR student would blow air directly into air tube connector 124. Removable face mask 120 is cone shaped with an internal air tube fitting 123 that interfaces with air tube connector 124. Face mask 120 can be smooth or stylized to represent the mouth and nose of a human.

The compression mechanism is made up of anterior or upper chest plate 130, upper cylinder 150, lower cylinder 160, and posterior or lower back plate 170. The anterior side of anterior or upper chest plate 130 contains various anatomical landmarks to train a user on the proper placement his or her hand or fingers, depending on the type of CPR being practiced (infant, child, or adult). FIG. 1 shows right clavical elevation 132a and right nipple elevation 132b. Also visible in FIG. 1 is xyphoid process 134 located on the distal end of the anterior or upper chest plate 130. In addition to or in place of the anatomical landmarks previously described, an external landmark 140 can be placed on the outside of non-humanoid housing 110 to indicate the proper location for placing a hand, hands, or fingers on the chest during CPR.

Upper cylinder 150 and lower cylinder 160 form a stabilizing telescoping post arrangement. The telescoping of these posts prevent chest plate 130 from being compressed in the wrong location. If a user presses over the left nipple elevation, for example, instead of between the nipple elevations the telescoping posts will prevent chest plate 130 from moving down. Upper cylinder 150 has a greater diameter than lower cylinder 160 so that upper cylinder 150 can slide down over lower cylinder 160 during chest compressions. Air vents 152a, 152b, 162a, and 162b are located on upper cylinder 150 and lower cylinder 160 respectively to allow air to escape from the internal chamber formed by upper cylinder 150 and lower cylinder 160 as the compression mechanism is compressed. In order to prevent upper cylinder 150 or lower cylinder 160 from rotating during use, a retainer screw 154 passes through upper cylinder 150 and travels up and down within a groove or alignment guide 164 carved into lower cylinder 160 as the compression mechanism is compressed. Three electrical contacts 156a, 156b, and 156c are located on the distal end of upper cylinder 150 and make up part of the compression depth sensor described in more detail in FIG. 2.

Figure 2:
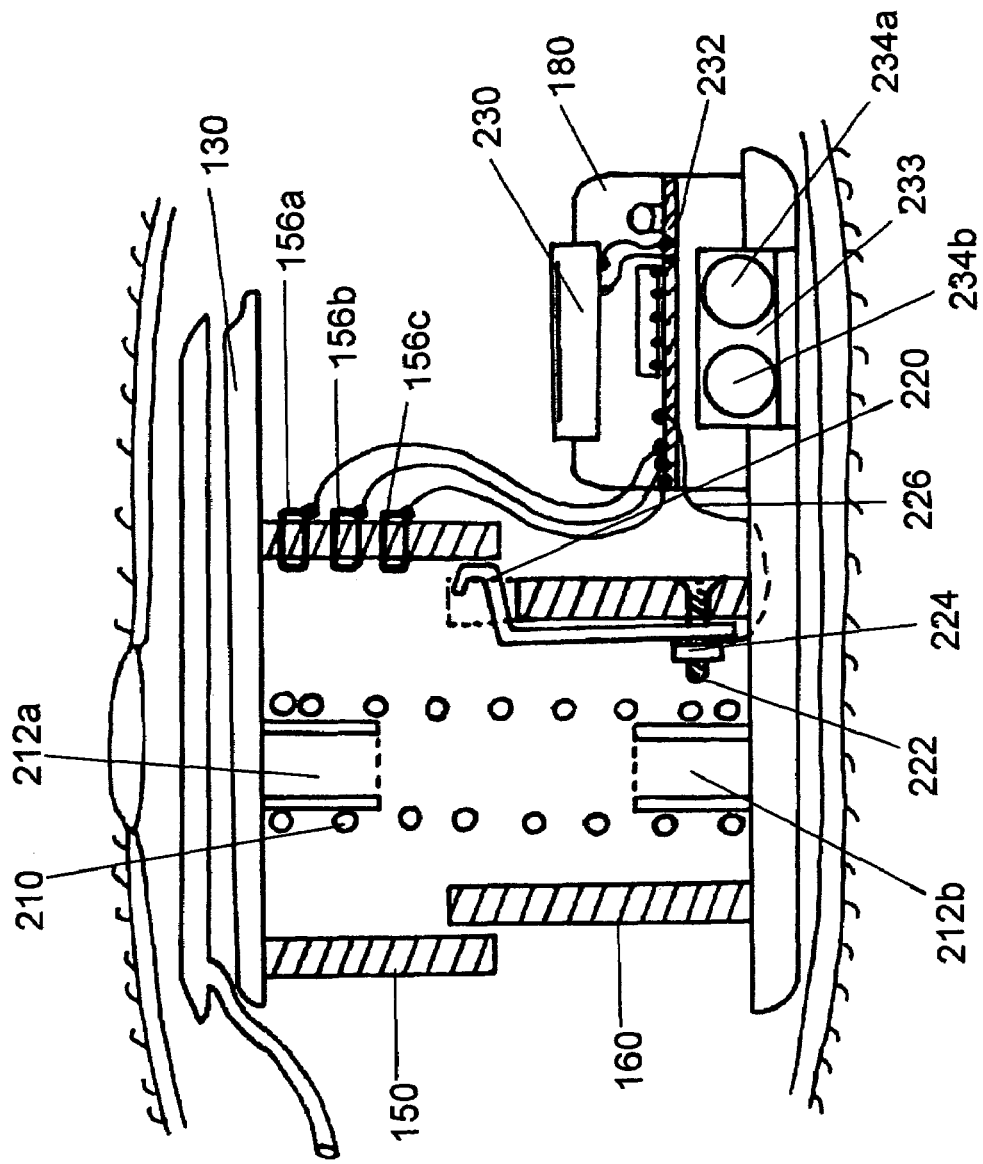
FIG. 2 is a cross-section view of the compression mechanism and the controller of the CPR training aid in FIG. 1.
Figure 3:
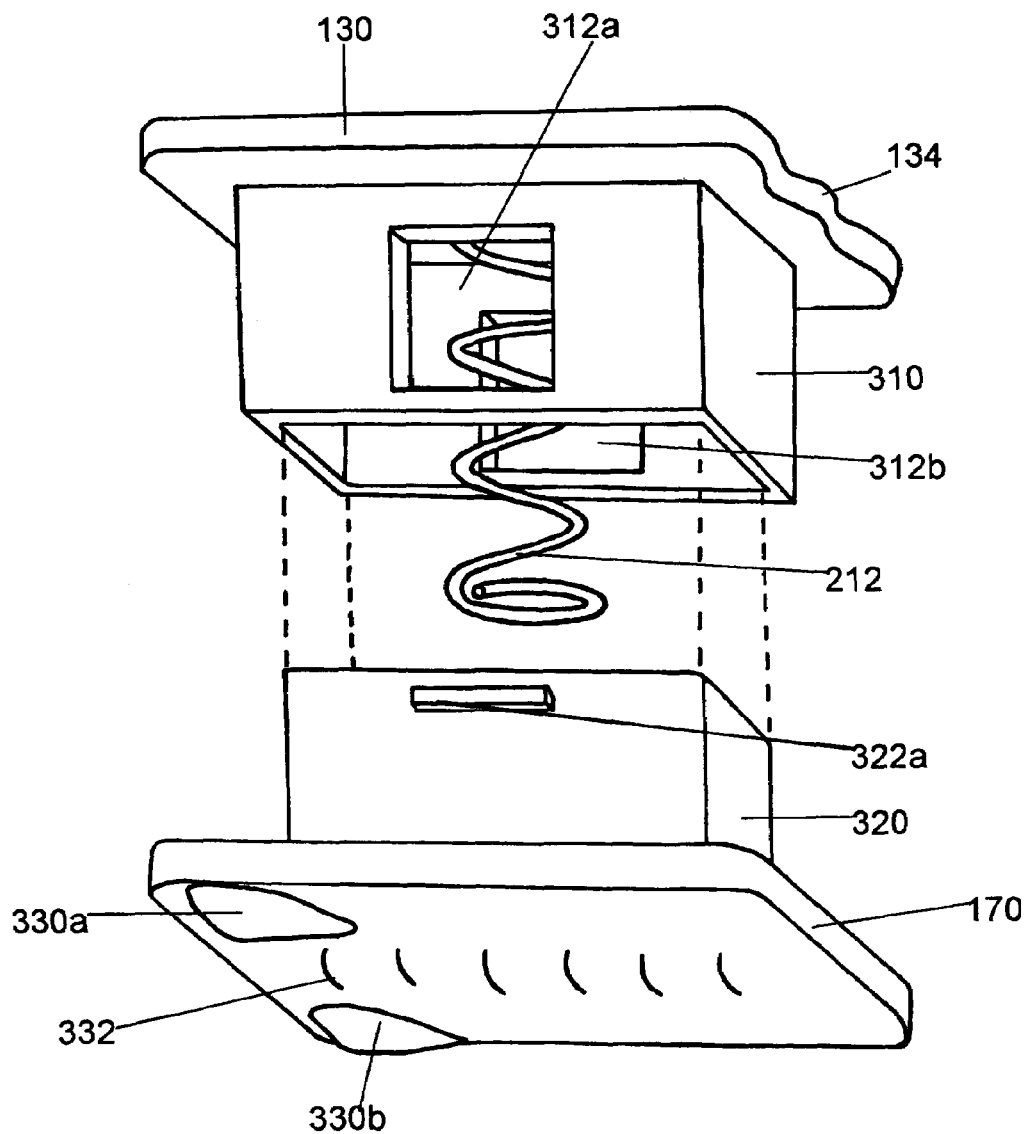
FIG. 3 is a perspective view of an alternative compression mechanism.

Posterior or lower back plate 170 also contains anatomical landmarks that are described in FIG. 3. Mounted on back plate 170 is controller 180 to control the power for the invention, sensing of depth or force of compression, pacing, prompting, and displaying feedback on CPR performance. Controller 180 is described in more detail in FIG. 2. Exiting the proximal side of controller 180 are wires 182a and 182b which lead to switch 84 in the hand of non-humanoid housing 110. This switch may be a momentary switch activated when the hand is squeezed and deactivated when the hand is squeezed a second time. In the present invention, switch 84 would initiate the controller to provide feedback and prompting for Infant CPR. A second switch in the opposite hand would initiate the controller to provide feedback and prompting for Child CPR. Switch 84 could also be located in the foot of non-humanoid housing 110 or some other location. Controller 180 also operates light emitting diode (LED) module 190 through wires 186a, 186b, and 186c. LED module 190 contains two LEDs, 188a and 188b, which indicate whether the compression mechanism is being compressed the proper depth. Each LED 188a and 188b shares a common ground wire that connects with the controller 180. LED module 190 is secured to non-humanoid housing 110 by retainer washer 192 and cotter pin 194.

FIG. 2 is a cross-section view of the compression mechanism and the controller 180 of the CPR training aid described in FIG. 1. A like number between FIG. 2 and FIG. 1 indicates a like element. Inside upper cylinder 150 and lower cylinder 160 is a spring 210 to provide resistance against the compression of chest plate 130. The amount of resistance could be calibrated for an infant, child, or adult chest depending on the CPR skills to be practiced with the invention. Spring stabilizers 212a and 212b keep the spring aligned and properly positioned within upper cylinder 150 and lower cylinder 160.

Electrical contacts 156a, 156b, and 156c are embedded in the distal side of upper cylinder 150 and protrude on the interior and exterior sides of upper cylinder 150. Electrical contacts 156a, 156b, and 156c are separated by a space that corresponds to the appropriate depths of compression for infant or child. They could also be separated by a space that corresponds to the appropriate depths of compression for adult CPR. Electric contact spring 220 rests in a groove cut in lower cylinder 160 and protrudes into the space between lower cylinder 160 and upper cylinder 150. It is secured to lower cylinder 160 by a screw 222 and nut 224. Screw 222 and nut 224 also secure wire 226 from controller 180 to electric contact spring 220.

A cross-section of controller 180 is also shown in FIG. 2. Inside the controller is a speaker 230, an electronic control board 232, and a battery compartment 233 with batteries 234a and 234b. The controller could also measure force.

FIG. 3 is a perspective view of an alternative compression mechanism. A like number between FIG. 3 and FIG. 1 or 2 indicates a like element. In this alternative, upper cylinder 150 and lower cylinder 160 are replaced with retangular or square shaped posts. Upper post 310 is attached to the posterior side of anterior or upper chest plate 130. The right and left sides of upper post 310 contain windows 312a and 312b for venting of air during compression. Windows 312a and 312b interface with tabs 322a and 322b (not shown) protruding from lower post 320, which is attached to the anterior surface of back plate 170. This interface prevents rotation of the posts during compression, acts as a guide during compression, and maintains the connection between upper post 310 and lower post 320 preventing them from separating during use. Spring 210, used to simulate the resistance of a human chest to compressions, is shown attached to the anterior side of upper post 310 and extends down into lower post 320 and attaches to the posterior side of lower post 320.

The posterior side of the dorsal or back plate 170 contains anatomical landmarks simulating the protrusion of the right and left scapulas 330a and 330b, and the spinal column 332, under human skin for locating the proper placement of back blows to clear the airway. Xyphoid process 134 is also visible on chest plate 130.

Figure 4:
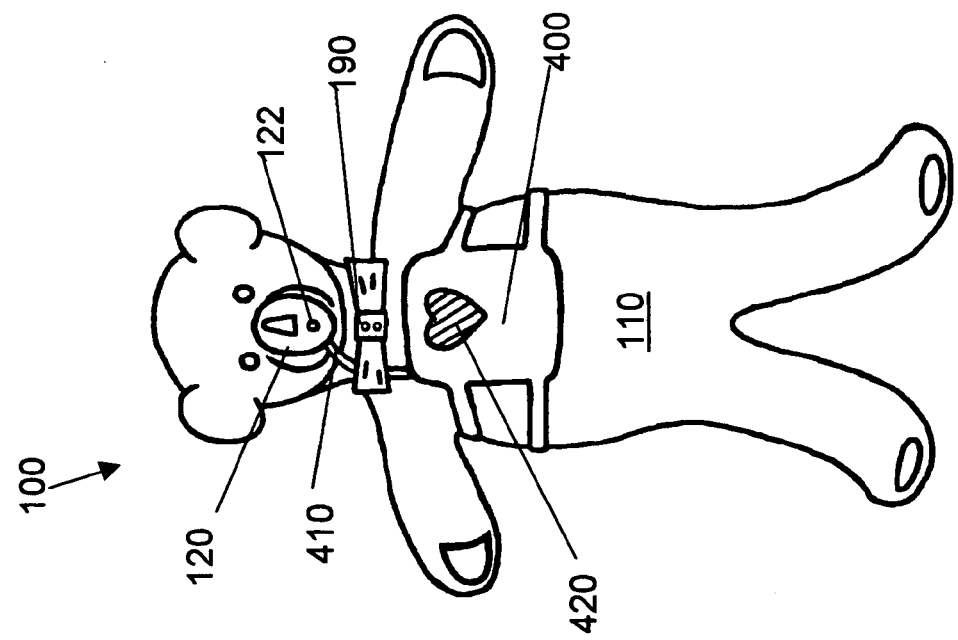
FIG. 4 is a non-humanoid CPR training aid in a teddy bear housing with an external simulated breathing mechanism according to the present invention.

FIG. 4 is a CPR training aid 100 in a non-humanoid housing 110 stylized like a teddy bear with an external simulated breathing mechanism according to the present invention. Face mask 120 is stylized to resemble a human nose and mouth. It contains opening 122, which is open to ambient air and which connects to air tube 410. Air tube 410 connects to a simulated lung (not shown) and allows a user to breath into face mask 120 and cause the simulated lung to rise up against removable vest 400. A landmark for identifying to location to properly compress the chest is indicated on vest 400 by heart 420. FIG. 4 also shows how LED module 190 can be made to look like a bowtie to add to the aesthetic appeal of the present invention.

Figure 5:
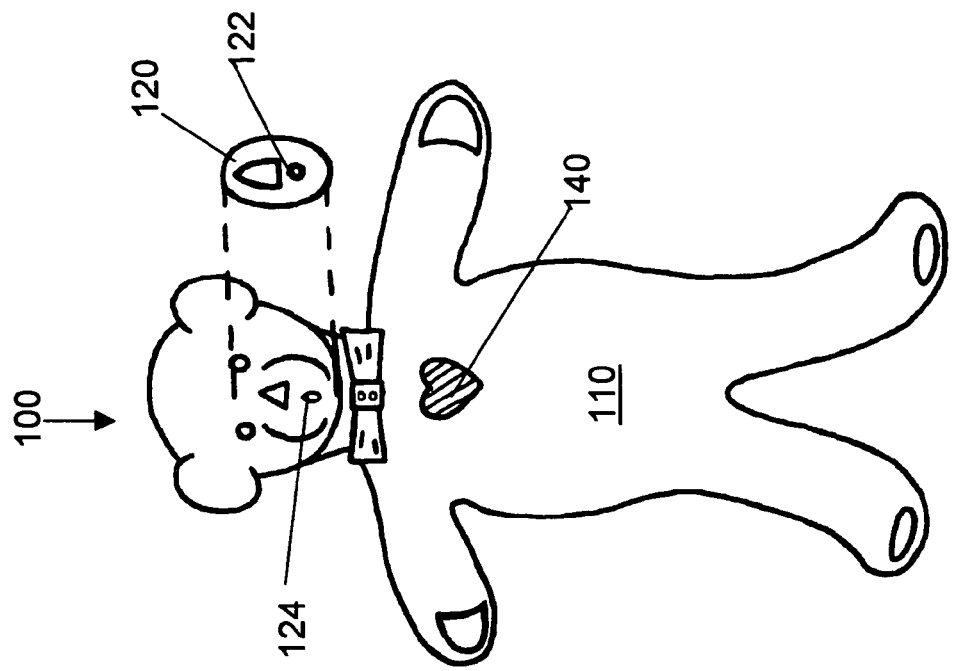
FIG. 5 is a non-humanoid CPR training aid in a teddy bear housing with an internal simulated breathing mechanism according to the present invention.

FIG. 5 is a CPR training aid 100 in a non-humanoid housing 110 shaped like a teddy bear with an internal simulated breathing mechanism according to the present invention. Face mask 120 is stylized as representative of a human nose and mouth. It is depicted as lifted up and away from air tube connector 124. Opening 122 on face mask 120 is also shown. Landmark 140 is shown as a stylized heart on the chest of the teddy bear.

Figure 6:
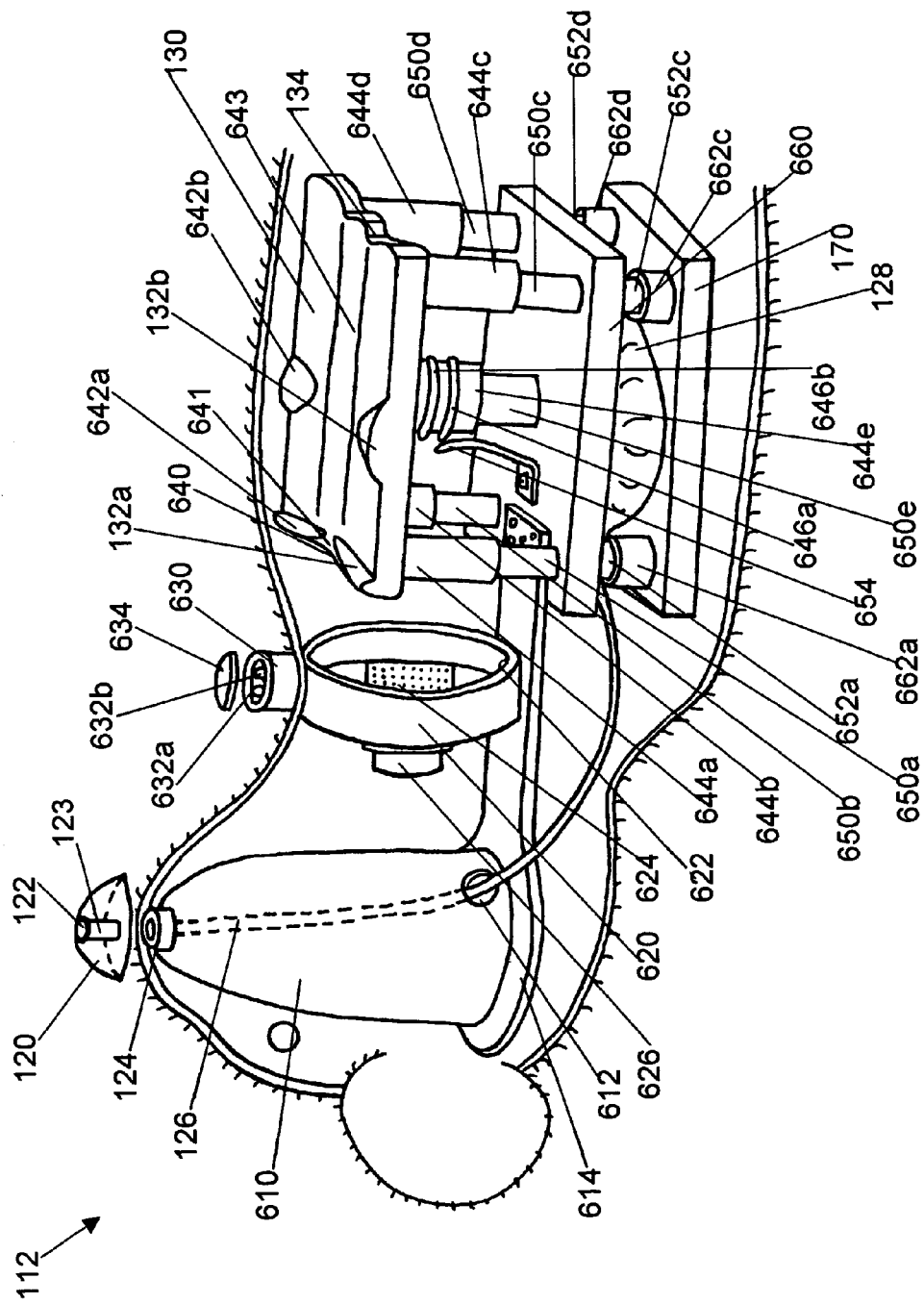
FIG. 6 is a perspective view of an alternative mechanism of a non-humanoid CPR training aid, according to the present invention.

Referring to FIG. 6, an alternative embodiment 112 of CPR training aid 110 is shown in perspective view according to the present invention. Alternative embodiment 112 includes a simulated airway, a compression feedback mechanism, and a compression mechanism.

The simulated airway consists of an optional removable face mask 120 with opening 122 which is open to ambient air and air tube fitting 123 that is inserted into air tube connector 124. Face mask 120 is attached to a face cone 610 at air tube connector 124. Air tubing 126 runs down from air tube connector 124 through the face cone 610 and exits the face cone at an opening 612. The air tubing then runs parallel along neck support 614 and attaches to simulated lung 128. Simulated lung 128 is located between middle plate 660 and dorsal or back plate 170 and may be disposable. It is calibrated to hold an amount of air equivalent to the amount of air contained in human lungs. The size of simulated lung 128, and hence the amount of air contained in the air bag, can be changed to approximate the amount of air in an infant's lungs, a child's lungs, or the lungs of an adult.

With reference to FIG. 6, the compression feedback mechanism is comprised of a circular collar 620 with its posterior end attached to neck support 614 by a connector 622, an electronic control board 624, a speaker 626, a LED module 630 attached to the anterior end of circular collar 620, LEDs 632a and 632b, and a lens 634. LEDs 632a and 632b can be attached by wires (not shown), although other embodiments could make this a wireless connection, to integrated circuit board 624 and electrical contacts 646a and 646b. Integrated circuit board 624 could be replaced with a microprocessor chip and speaker, which could provide voice prompting or other auditory prompting for practicing CPR skills. The integrated circuit board 624 is also attached by wires (not shown) to a power source. Lens 634 and LED module 630 preferably project up through the non-humanoid housing so that they can be seen by the user while practicing CPR.

The compression mechanism is comprised of anterior or upper chest plate 130, middle plate 660, and dorsal or back plate 170. Neck support 614 is connected to middle plate 660 which has five solid or hollow round posts projecting anteriorly toward chest plate 130 and four solid or hollow round posts projecting posteriorly toward dorsal or back plate 170. There are four anterior posts 650a-650d and four posterior posts 652a-652d (although 652b is not shown) at each of the four corners of middle plate 660 and one anterior center post 650e on middle plate 660. The anterior center post 650e contains a spring, see FIGS. 2 and 3, to simulate the resistance of a human chest to compressions. In the alternative, any or all of the projecting legs could be hollow and contain a spring for resistance. The amount of resistance could be calibrated for an infant, child, or adult chest depending on the CPR skills to be practiced with the invention.

There is also an electric contact spring 654 attached to middle plate 660 between the attachment of neck support 614 to middle plate 660 and center post 650e. This electrical contact spring 654 is connected to integrated circuit board 624 by wires (not shown), but could be interfaced wirelessly. The spring curves upward toward anterior or upper chest plate 130 and is meant to interface with electrical contacts 646a and 646b on a posterior post 644e as anterior or upper chest plate 130 is compressed. Alternatively, the electrical contact spring 654 and the electrical contacts 646a and 646b could be replaced with some other type of force sensor.

Dorsal or back plate 170 interfaces with middle plate 660 at posts 652a-652d (652b is not shown) which project downwardly or posteriorly from middle plate 660 and anterior posts 662a-662d (662b is not shown) which project upwardly or anteriorly from dorsal or back plate 170. The posterior posts 652a-652d and the anterior posts 662a-662d form a stabilizing telescoping post arrangement. The telescoping of these posts prevent the anterior or upper chest plate 130 from being compressed in the wrong location. If a user presses over the left nipple elevation 642b, for example, instead of between the nipple elevations the telescoping legs will prevent the anterior or upper chest plate 130 from moving down. Anterior posts 662a-662d have a greater diameter than posterior posts 652a-652d so that posterior posts 652a-652d can slide down into anterior posts 662a-662d.

The posterior side of the dorsal or back plate 170 contains anatomical landmarks simulating the protrusion of the right and left scapulas and the spinal column, as shown in FIG. 3, under human skin for locating the proper placement of back blows to clear the airway.

Anterior or upper chest plate 130 interfaces with middle plate 660 at anterior posts 650a-650d and 650e which project upwardly or anteriorly from middle plate 660 and posterior posts 644a-644d and 644e which project downwardly or posteriorly from anterior or upper chest plate 130. The anterior posts 650a-650d and 650e and the posterior posts 644a-644d and 644e form a stabilizing telescoping post arrangement. The telescoping of these posts prevent the anterior or upper chest plate 130 from being compressed in the wrong location. Posterior posts 644a-644d and 644e have a greater diameter than anterior posts 650a-650d and 650e so that anterior posts 650a-650d and 650e can slide up into posterior posts 644a-644d and 644e as anterior or upper chest plate 130 is compressed.

Center posterior leg 644e also has two electrical contacts 646a and 646b, which are separated by a space that corresponds to the appropriate depths of compression for infant, child, or adult CPR. For example, in a CPR training aid for infant CPR, electrical contact 646b would be about ½ inch from the underside of the anterior or upper chest plate 130 and electrical contact 646a would be about 1 inch from the underside of the anterior or upper chest plate 130. When the anterior or upper chest plate 130 is compressed about ½ inch, the electric contact spring 654 will come into contact with electrical contact 646a and the user will be given a signal that the desired compression depth has been reached. In the preferred embodiment, this would be a green LED 632a lighting up in LED module 630, however any color LED could be used or some other type of signal to notify the user that the desired compression depth has been reached. When the anterior or upper chest plate 130 is compressed about 1 inch or more the electric contact spring 654 will come into contact with electrical contact 646b and the user will be given a signal that the desired compression depth has been exceeded. In the preferred embodiment, this would be a red LED 632b lighting up in LED module 630, however any color LED could be used or some other type of signal to notify the user that the desired compression depth has been exceeded. In addition, other electrical contacts could be added to the center posterior leg 644e attached to the anterior or upper chest plate 130 to indicate various compression depths for infant, child, and adult CPR together in one embodiment of the present invention. LED module 630 could also contain a numerical counter that displays the number of compressions given, and an auditory or visual signal, or both, could indicate when it is time to give a rescue breath.

The anterior side of anterior or upper chest plate 130 contains various anatomical landmarks to train a user on the proper placement his or her hand or fingers, depending on the type of CPR being practiced (infant, child, or adult). A manubrial notch 640 is located on the proximal end of the anterior or upper chest plate 130. Below the manubrial notch 640 are right and left clavical elevations 132a and 642a. Between the clavical elevations is an inter-clavicular notch 641. Running the length of the anterior or upper chest plate 130 is a sternal grove 643. To each side of the anterior or upper chest plate 130 are right and left nipple elevations 132b and 642b. At the distal end of the anterior or upper chest plate 130 is a xyphoid process and notch 134. The preferred embodiment is to create the anterior or upper chest plate 130 out of one piece of material, however, a softer material could be used for the anatomical markings and a harder material used to anchor the anatomical markings to the posterior telescoping posts of the anterior or upper chest plate 130.

The upper, middle, and lower chest plates 130, 660, and 170 and their associated mechanisms can be surrounded with fabric to protect the mechanisms from the stuffing in the non-humanoid housing.

Figure 7:
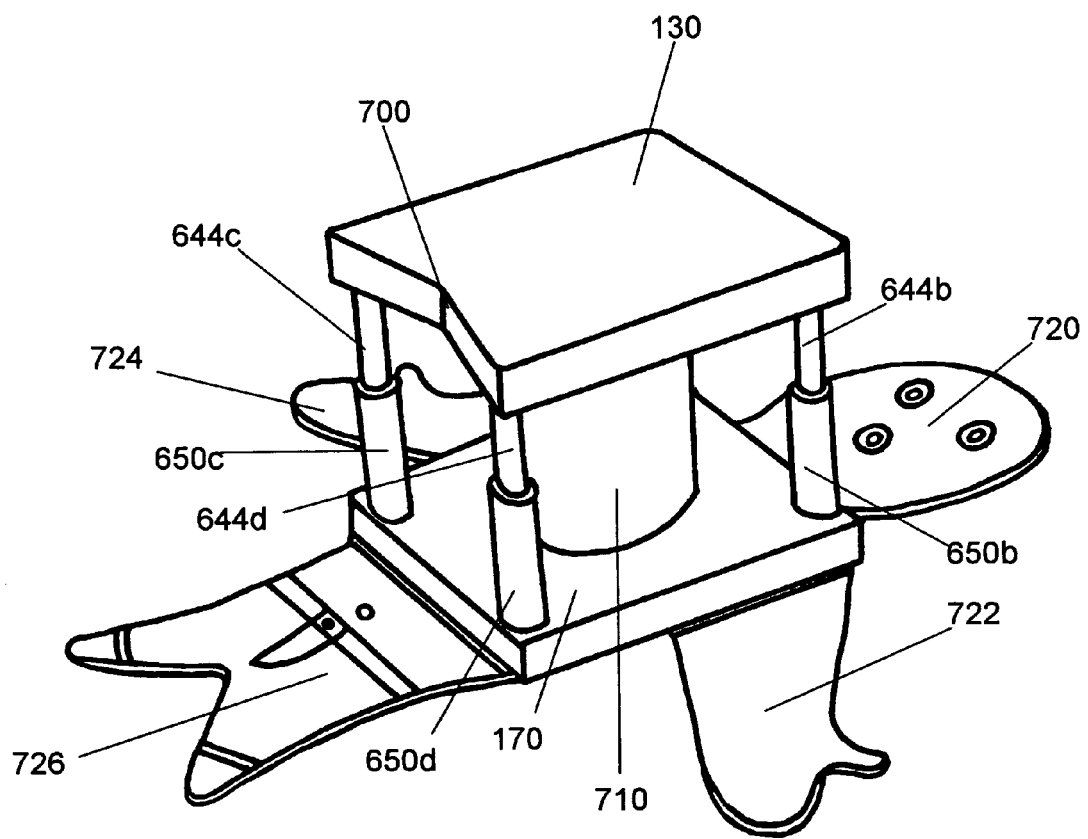
FIG. 7 is a perspective view of an alternative embodiment of the present invention that can be folded compactly for transport or storage.

FIG. 7 is an alternative embodiment of the present invention. This embodiment consists of chest plate 130 with four posterior posts 644a (not shown), 644b, 644c, and 644d and back plate 170 with four anterior posts 650a (not shown), 650b, 650c, and 650d which interface with the four posterior posts of the chest plate to form stabilizing telescoping posts.

In the center between chest plate 130 and the back plate 170 is a compressible material 710 used to simulate the resistance of the human chest to compressions. A xyphoid notch 700 is visible on chest plate 130. Other landmarks may be drawn on the chest plate or may be elevated simulations. For added decoration, flip-up arms 722 and 724, legs 726, and a flip-up head 720 are added. When these flip-up elements are folded up toward the central mechanism, the entire invention can be slipped into a small, compact box for storage. Other performance feedback mechanisms of CPR training aid 100 described above could also be added to the invention shown in FIG. 7.

2. Operation of Invention.

The innovation in this training aid is that it is aesthetically pleasing enough that CPR students would likely place it in a prominent place in their home (or workplace). It is believed that placing an aesthetically-pleasing training aid in a prominent place that is seen everyday will contribute to greater retention of CPR skills, increased occurrence of practicing CPR skills at home, and an increased sense of confidence that a person can successfully resuscitate a victim.

CPR training aid 100 described in the present invention could be used in all CPR classes, but in particular, in Infant/Child CPR classes. The CPR instructor would conduct the class in accord with nationally and internationally recognized standards, but each student would be given their own CPR training aid 100 to practice the skills they are learning as they are learning them. Although the CPR training aid described in the present invention is not housed in an infant or child body, it is capable of being used to practice rescue breathing, chest compressions, and clearing the airway either through back blows or abdominal thrusts. In fact, it is believed that the non-humanoid shape of the housing 110 will actually be less intimidating for new or anxious parents hesitant to practice CPR on a device that resembles their own child.

The advantage of using CPR training aid 100 as opposed to other inexpensive training manikins, is that students will get immediate feedback on their compression force and/or depth and can achieve proper pacing of the compressions by listening to the metronome. At the end of the class, the instructor would send the students home with CPR training aid 100 and instructions to place it in a prominent place in their homes to remind them of the skills they have just learned and to encourage them to pick-up the CPR training aid on a regular basis to practice their CPR skills. CPR training aid 100 can also be used at home or at work in conjunction with a CPR instructional video.

Although CPR training aid 100 is not intended for use during an actual emergency, if a parent places CPR training aid 100 in their child's room and an emergency arises, the parent could turn on the CPR training aid 100 to remind himself or herself of the steps of CPR and then pace their actual compressions on their child using the metronome in CPR training aid 100.

Although CPR training aid 100 can be housed in a non-humanoid housing of any kind, for the purposes of this description it will be assumed to be in a teddy bear. CPR training aid 100 can be turned on by pressing a momentary switch 184 in a paw. To practice Infant CPR skills, the user would press the right paw. To turn it off, the user would press that paw again. To practice Child CPR skills, the user would press the left paw. To turn it off, the user would press the paw again.

A voice prompt provided by a microprocessor chip on electronic control board 232 reminds the user of the steps of either Infant or Child CPR depending on the mode selected including but not limited to prompts such as "shout and gently tap the baby on the shoulder," "tilt the baby's head by lifting the chin and give the baby two small gentle breaths covering the baby's mouth and nose with your mouth," etc. After reviewing the steps of CPR, the user will be prompted to begin practicing CPR. The user would locate anatomical landmarks on chest plate 130 that can be felt through the fur to determine the proper placement of the hand or fingers on the chest for chest compressions. In addition, an external landmark, such as a red heart, may be sewn to the outside of the fur to quickly indicate proper hand or finger placement. When prompted, the user would begin to compress the chest of the teddy bear in time with the voice prompts or metronome. The voice prompt will count the number of compressions to be given and then will tell the user to give a rescue breath.

By pressing down on chest plate 130, upper cylinder 150 slides down over lower cylinder 160. The user will feel resistance similar to that of a human chest because of spring 210 inside of upper cylinder 150 and lower cylinder 160. Spring 210 compresses directly downward because of spring stabilizers 212a and 212b. Rotation of chest plate 130 and back plate 170 during compressions is prevented by retainer screw 154 as it travels up and down within a alignment guide 164 carved into lower cylinder 160. If hand or finger placement is incorrect, the user is signaled to readjust when the chest plate fails to compress smoothly. The telescoping nature of upper cylinder 150 and lower cylinder 160 resist compression unless the compression is centered over those cylinders.

Electrical contacts 156a, 156b, and 156c on upper cylinder 150 act as depth sensors for indicating whether a compression is too soft, too hard, or just right. For example, in CPR training aid 100 electrical contact 156a would be about ½ inch from the underside of the anterior or upper chest plate 130, electrical contact 156b would be about 1 inch from the underside of the anterior or upper chest plate 130, and electrical contact 156c would be about 1½ inches from the underside of the anterior or upper chest plate 130. If Infant CPR is initiated by squeezing switch 84 and the anterior or upper chest plate 150 is compressed about ½ inch, the electric contact spring 220 will come into contact with electrical contact 156c and the user will be given a signal that the desired compression depth has been reached for Infant CPR. In the preferred embodiment, this would be a green LED lighting up in the LED module 190, however any color LED could be used or some other type of signal to notify the user that the desired compression depth has been reached. If Child CPR has been activated, then no signal will be given to the user at this compression depth.

When the anterior or upper chest plate 150 is compressed about 1 inch the electric contact spring 220 will come into contact with electrical contact 156b and the user will be given a signal that the desired compression depth has been exceeded if in Infant CPR mode. In the preferred embodiment, this would be a red LED 136 lighting up in the LED module 190, however any color LED could be used or some other type of signal to notify the user that the desired compression depth has been exceeded. If in Child CPR mode, the user will be given a signal that the desired compression depth has been reached. When the anterior or upper chest plate 150 is compressed about 1½ inches or more the electric contact spring 220 will come into contact with electrical contact 156a and the user will be given a signal that the desired compression depth has been exceeded for both the Infant CPR and Child CPR modes.

After being prompted to give five compressions with two fingers (for Infant CPR) or the heel of one hand (for Child CPR), the user will be prompted to provide one rescue breath. The user can pretend to blow into the teddy bear's mouth, or the user can utilize optional face mask 120 and blow into opening 122. Air tube fitting 123 of removable face mask 120 is inserted into air tube connector 124 of air tube 124. The users mouth is placed on face mask 120 and a breath is given. Air travels down air tube 124 and expands simulated lung 128. As simulated lung 128 expands, the chest of the teddy bear will rise simulating the rise of a child's chest when rescue breaths are given. Face mask 120 may be thrown away after use or cleaned for reuse. In addition simulated lung 128 could be removed through an opening in non-humanoid housing 110 and disposed of and replace with a clean simulated lung 128 through the same opening.

In addition to practicing chest compressions and rescue breathing, CPR training aid 100 can be used to practice clearing a blocked airway using abdominal thrusts or back blows. The distal end of anterior or upper chest plate 130 has a palpable xyphoid process 134. The user would use the distal end of anterior or upper chest plate 130 and the xyphoid process 134 as landmarks for identifying the proper location to apply abdominal thrusts to clear the airway. The posterior side of the dorsal or back plate 170 contains anatomical landmarks simulating the right and left scapulas 330a and 330b and the spinal column 332. A user would locate these landmarks and practice applying back blows between the scapulas to clear the airway.

3. Description and Operation of Alternative Embodiments.

In performing CPR there are different amounts of force, depth of compression, rate, etc. for an infant, a child, and an adult. For these reasons, the drawings are not to be understood as showing the precise sizes or proportions of the moving and stationary parts of the apparatus nor are the proportions shown to be regarded as critical or essential to the invention. Machines embodying the invention may be made of various sizes and proportions and having different degrees of resistance or resiliency so as to be adapted for practice of various CPR techniques.

Although a teddy bear is depicted in FIGS. 1, 4, 5, and 6, a teddy bear is not the only type of non-humanoid housing that might be appropriate. Other options include a rabbit, a monkey, or a dog. In addition, the internal mechanism may also be placed in an inanimate object that could be placed conspicuously in a home such as a throw pillow.

CPR training aid 100 is turned on by a momentary switch 84 in the paw of the teddy bear. An alternative to switch 84 being located in the paw of non-humanoid housing 110, it could be located in the foot or on the back of the neck of non-humanoid housing 110. Instead of a momentary switch, a slider or other type of switch could be used.

Instead of a voice prompt, CPR training aid 100 could have a simple metronome and speaker on electronic control board 232 to provide compression pacing for the user. The metronome can be calibrated to adhere to American Heart Association guidelines for infant, child, or adult CPR. The steps of CPR could be printed somewhere on non-humanoid housing 110, such as on a teddy bear's bowtie or on a patch sewn on the outside of non-humanoid housing 110.

Anatomical landmarks on chest plate 130 and back plate 170 are not essential to the invention. In the alternative, an external landmark, including but not limited to a red heart as shown in FIG. 5, may be sewn or attached to the outside of a non-humanoid housing to quickly indicate the location for proper hand or finger placement.

Although telescoping posts in CPR training aid 100 prevent improper hand or finger placement on the chest by resisting compressions given in the wrong location, another embodiment that will achieve the same effect is to cut a hole in the center of the anterior or upper chest plate 130 and between the nipple elevations 132b and 642b and cover the hole with a soft, flexible material. The anterior posts 650a-650d and posterior posts 644a-644d would each be of equal length and would not be capable of moving. However, posterior post 644e would be shorter than anterior post 650e and would be capable of sliding down anterior post 650e as the soft center portion of the anterior or upper chest plate 130 is compressed. When a user presses the wrong location, such as over the left nipple elevation, the anterior or upper chest plate 130 will not move. In addition, a visual or auditory signal could be provided in any of the embodiments of this invention that would indicate whether a user is compressing the chest in the correct or incorrect location.

While the compression mechanism of CPR training aid 100 is described as having an upper and lower cylinder, an alternative embodiment is an upper and lower square or rectangular box as shown in FIG. 3. The telescoping box would function in the same manner as the telescoping cylinder in FIG. 1, but instead of retainer screw 54 and alignment guide 164 preventing rotation of upper plate 130 and lower plate 170, the same function would be served by windows 312a and 312b and tabs 322a and 322b (not shown) protruding from lower post 320. Windows 312a and 312b on the right and left sides of upper post 310 also vent air during compression. Another embodiment of the compression mechanism is shown in FIG. 6 and includes a plurality of telescoping posts shaped like cylinders. It should be understood by those skilled in the art that the term "post" can refer to a post of any shape (e.g., cylindrical, square, rectangular, etc.). The compression mechanism described for CPR training aid 100 includes a spring 210 for resistance to compression of upper plate 130. Resistance can be provided by other devices as well, such as a closed cell foam spring as shown in FIG. 7. In addition, the resistance device can stand alone, be located in one central post, or be located in a plurality of posts.

CPR training aid 100 is described with three electrical contacts 156a, 156b, and 156c embedded inside the distal portion of upper cylinder 150 that make contact with electric contact spring 220 as chest plate 130 is compressed. In this embodiment, both Infant CPR and Child CPR compression depths can be sensed and indicated. However, this embodiment could be adapted to indicate compression depths for only Infant CPR, only Child CPR, only Adult CPR, or any combination of the three. Another embodiment for the depth sensor is shown in FIG. 6. This arrangement demonstrates an adaptation for providing compression sensing and feedback on only one type of CPR (Infant, Child, or Adult). Center posterior leg 644e has two electrical contacts 646a and 646b that encircle it externally, and which are separated by a space that corresponds to the appropriate depths of compression for infant, child, or adult CPR. When chest plate 130 is compressed, the electric contact spring 654 contacts electrical contacts 646a and 646b and the user is given a signal that the desired compression depth has been reached or exceeded. Although each of the compression sensors shown in the drawings are measuring compression depth, an alternative embodiment could include a force sensor to measure compression force. Also shown in FIG. 6 is LED module 630, electronic control board 624, and speaker 622 attached to circular collar 620. This arrangement can provide greater stability in the neck region of the non-humanoid housing 110. LED module 630 also had a separate lens 634 covering the LEDs 632a and 632b.

In an alternative embodiment, LED module 190 or 630 could also contain a numerical counter that displays the number of compressions given. LED modules 190 or 630 could contain a single LED, a plurality of LED's, could contain a mechanism to indicate integers to count up the number of compressions given, or any combination thereof. In addition, an auditory or visual signal, or both, could indicate when it is time to give a rescue breath.

Although a simulated airway is described for the present invention, it is not a necessary component of the invention. A simulated airway may be left out of an embodiment of the present invention and a user could simply pretend to give rescue breaths when prompted to do so. An alternative embodiment of the airway shown in FIG. 1 is described in FIG. 6. This embodiment includes a nose cone 610 and simulated lung 128 resting between back plate 170 and middle plate 660. As upper plate 130 is compressed, any air in simulated lung 128 is compressed out of simulated lung 128, up air tube 126 and out opening 122. An alternative embodiment of the removable face mask 120 is to attach it to a string that is then sewn into a pocket somewhere on or in the non-humanoid housing 110. When not in use, the removable face mask 120 could be stored in the pocket. The string attaching the removable face mask 120 to the pocket would ensure that the removable face mask 120 is not lost or misplaced when not attached to air tube connector 124. The string and pocket are not necessary parts of the present invention. Another embodiment of a simulated airway is described in FIG. 4. In this embodiment, the airway is external to the non-humanoid housing. Air tube 410 is connected to face mask 120 and a simulated lung (not shown). The simulated lung resides under removable vest 400, and will raise the vest when a breath is given simulating the rise of a human chest during rescue breathing. This embodiment would provide the easiest removal and replacement of a disposable simulated lung and could also function without vest 400. In a further embodiment of FIG. 4, air tube 410 could connect to a lung simulated by a spirometer with an indicator of when the proper amount of air is blown into opening 122.

FIG. 7 teaches an alternative embodiment of the present invention that is not contained in a non-humanoid housing. This embodiment consists of unique telescoping posts 644a-644d and 650a-650d and a closed cell foam spring centrally located between upper plate 130 and lower plate 170. In order to allow th entire invention to be slipped into a small, compact box for storage, flip-up arms 722 and 724, legs 726, and a flip-up head 720 are added. Other performance feedback mechanisms of CPR training aid 100 described above could also be added to this embodiment of the present invention.

It will be understood by those skilled in the art that many variations and modifications may be made in the present invention without departing from the spirit and the scope thereof. Thus, the scope of the invention should not be limited to the embodiments described above.

The invention claimed is:

1. An apparatus for training or simulating human cardiopulmonary resuscitation (CPR) comprising: a stuffed, non-human toy animal housing containing:
    a first plate;
    at least one upright post fixed to the first plate;
    a second plate;
    at least one downwardly extending post fixed to the second plate and adapted to telescopically engage upright post for providing a human chest compressions; and
    a resistance device engaged between the first and second plates and adapted to simulate the resistance one would encounter in compressing a human chest.

2. The apparatus of claim 1, wherein one or more posts are hollow and are adapted for a telescopic-like engagement having sufficiently tight tolerances to require applying force in a direction essentially parallel with the longitudinal axis of the posts so that the posts will bind when a non-parallel force is applied to an upper surface of the second plate.

3. The apparatus of claim 1, wherein the resistance device is a spring and it is located within one or more posts.

4. The apparatus of claim 1, wherein the resistance device is a closed cell foam spring.

5. The apparatus of claim 1, wherein one or more posts are square or rectangular in shape to prevent rotation of the posts.

6. The apparatus of claim 5, wherein the distal ends of the one or more posts are flared.

7. The apparatus of claim 1, wherein the first and second plates are generally rectangular.

8. The apparatus of claim 1, wherein the first and second plates contain anatomical landmarks.

9. The apparatus of claim 8, wherein the second plate has anatomical landmarks on an upper surface adapted to resemble a chest to indicate proper hand or finger placement for applying CPR.

10. The apparatus of claim 1, wherein a landmark on the housing marks the location for properly compressing the chest during CPR.

11. The apparatus of claim 1, comprising a generally central upright post fixed to the first plate and a generally central downwardly extending post fixed to the second plate and opposed to and engaged with the generally central upright post, wherein the spring device is received within the generally central upright post.

12. The apparatus of claim 1, wherein the housing is a teddy bear.

13. The apparatus of claim 1, further comprising a metronome.

14. The apparatus of claim 1, further comprising a compression force sensor for measuring the amount of force used to press the first and second plates closer together and an indicator to the user of the force applied.

15. The apparatus of claim 1, further comprising a compression depth sensor for measuring the distance traveled when pressing the first and second plates closer together and an indicator of whether this distance is an appropriate distance for proper CPR.

16. The apparatus of claim 15, wherein the housing has a neck, and the indicator is located in the neck of the housing and is stylized to look like a brooch or bowtie.

17. The apparatus of claim 1, further comprising a rescue breath indicator to indicate when a breath should be given in the CPR cycle.

18. The apparatus of claim 1, further comprising voice prompts to remind a user of the steps of CPR.

19. The apparatus of claim 18, wherein the voice prompts provide feedback on actual CPR performance.

20. The apparatus of claim 1, further comprising:
    a flexible container adapted to simulate human lungs; and
    an air tube connected to the flexible container.

21. The apparatus of claim 1, further comprising an apparatus for simulating pulmonary resuscitation.

22. The apparatus of claim 21, wherein the simulated pulmonary resuscitation apparatus comprises a flexible container sized to simulate the capacity of human lungs, wherein the flexible container is received in an interior portion of the housing and one end of an air tube is connected to the flexible container while the other end opens to the environment and allows air to flow into the flexible container from the external environment.

23. The apparatus of claim 21, wherein the apparatus for simulating pulmonary resuscitation comprises a simulated lung, an air tube connected to the simulated lung, a face mask connected to the air tube, and an opening in the face mask where air can be blown into the air tube and the simulated lung causing the simulated lung to expand.

24. An apparatus for practicing human cardiopulmonary resuscitation (CPR) a stuffed toy housing comprising a chest plate and back plate, a compression depth sensor, a compression depth indicator located on the CPR training aid and in the line of sight of the user while the user is practicing CPR, wherein the stuffed toy housing has a neck, and the compression depth indicator is located in the neck of the stuffed toy housing.

25. The apparatus of claim 24, further comprising a simulated airway.

26. The apparatus of claim 25, wherein the airway simulates the resistance of a human lung and the rise of the chest when breaths are given.

27. The apparatus of claim 26, further comprising an external face mask that attached to an internal air tube which is attached to an internal simulated lung to facilitate practicing breaths given during CPR.

28. The apparatus of claim 27, wherein the face mask is a stylized human face.

29. The apparatus of claim 24, further comprising auditory voice prompts.

30. The apparatus of claim 29, wherein the voice prompts remind a user of the steps of CPR.

31. The apparatus of claim 29, wherein the voice prompts indicate proper or improper performance of CPR skills.

32. The apparatus of claim 24, further comprising a landmark on the stuffed toy housing to indicate the proper location for hand or finger placement during CPR.

33. The apparatus of claim 32, wherein the landmark is a stylized heart.

* * * * *

UNITED STATES PATENT AND TRADEMARK OFFICE
CERTIFICATE OF CORRECTION

PATENT NO. : 7,223,103 B2
APPLICATION NO. : 10/939079
DATED : May 29, 2007
INVENTOR(S) : Elroy T. Cantrell and Melissa K. Waugh It is certified that error appears in the above-identified patent and that said Letters Patent is hereby corrected as shown below:

Claim 1, col. 14, line 4, after "providing a" insert --reciprocal motion to stimulate--.

Claim 24, col. 15, line 18, after "(CPR)" insert --comprising--.

Claim 24, col. 15, line 18, after "housing" insert --,--.

Claim 24, col. 15, line 18, after "housing" delete "comprising".

Claim 27, col. 16, line 7, after "mask" delete "that".

Signed and Sealed this

Fourteenth Day of July, 2009

JOHN DOLL
*Acting Director of the United States Patent and Trademark Office*